(12) United States Patent
Biener

(10) Patent No.: US 7,677,351 B2
(45) Date of Patent: Mar. 16, 2010

(54) ELECTROHYDRAULIC STEERING SYSTEM

(75) Inventor: Rainer Biener, Steinfeld (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 11/996,523

(22) PCT Filed: Jul. 12, 2006

(86) PCT No.: PCT/EP2006/006794

§ 371 (c)(1),
(2), (4) Date: Jan. 23, 2008

(87) PCT Pub. No.: WO2007/012399

PCT Pub. Date: Jan. 2, 2007

(65) Prior Publication Data

US 2008/0202841 A1    Aug. 28, 2008

(30) Foreign Application Priority Data

Jul. 27, 2005   (DE) .................. 10 2005 035 171

(51) Int. Cl.
B62D 5/08 (2006.01)
(52) U.S. Cl. ...................................... 180/404
(58) Field of Classification Search .............. 180/406, 180/403, 414, 441, 404, 421, 422, 442
See application file for complete search history.

(56) References Cited

U.S. PATENT DOCUMENTS

| 5,215,158 | A |   | 6/1993 | Pedersen |
| 6,102,150 | A | * | 8/2000 | Bohner et al. ............... 180/403 |
| 6,971,472 | B2 |  | 12/2005 | Pedersen et al. |
| 2004/0182636 | A1 |  | 9/2004 | Pedersen et al. |

FOREIGN PATENT DOCUMENTS

| DE | 40 31 951 | 4/1992 |
| DE | 102 57 130 | 7/2004 |
| JP | 61-143263 | 6/1986 |

OTHER PUBLICATIONS

RD 14 365/07.03. "Steering Assembly Model LAGC." pp. 1-10. With Certified English Translation.

* cited by examiner

Primary Examiner—Lesley Morris
Assistant Examiner—Levon Fiore
(74) Attorney, Agent, or Firm—Michael J. Strker

(57) ABSTRACT

An electrohydraulic steering system includes a steering unit, triggerable via a user control element, for supplying a steering motor with pressure fluid. As a function of the actuation of the user control element or as a function of an external signal, the steering motor can be supplied with an additional quantity of pressure fluid via a steering valve. A blocking valve is located in the flow path of the additional pressure fluid and can be put in a blocking position in order to block the flow path of the additional pressure fluid to the steering motor.

12 Claims, 2 Drawing Sheets

ELECTROHYDRAULIC STEERING SYSTEM

BACKGROUND OF THE INVENTION

The invention relates to an electrohydraulic steering system.

Electrohydraulic steering systems are intended predominantly to offer the user of an agricultural machine greater comfort or to make automatic procedures possible. These agricultural machines include for instance agricultural tractors and wheel loaders.

In German Patent Disclosure DE 102 57 130 A1, an electrohydraulic steering system of this generic type is disclosed in which pressure fluid is fed to a steering motor via a steering unit, as a function of a steering lock set via a user control element, such as a steering wheel or a joystick. The fundamental construction of this kind of steering unit, also known as Orbitrol, is disclosed for instance in the data sheet RD 14 365/07.03 published by the present Applicant. A steering unit of this kind essentially comprises a manually actuated servo valve of the rotary slide valve type, a rotor set (metering pump) operating on the gerotor principle, and the valves necessary for the hydraulic steering circuit. For increasing the steering quantity, parallel to the flow of pressure fluid fed to the steering motor via the steering unit, an additional volumetric flow of pressure fluid is fed into the steering motor via a steering valve. This kind of electrohydraulic steering system, in tractors, for instance, makes it possible to drive in unplanted wheel tracks, where the control is done via external signals, such as position signals of a GPS, and the steering quantity is set solely by way of the steering valve. In a so-called booster steering system, in addition to the volumetric flow of pressure fluid fed via the steering unit, a defined additional quantity of pressure fluid is fed to the steering motor via the steering valve, so that for a defined steering angle at the wheels of the machine, the number of turns of the steering wheel necessary is reduced. A power steering system can also be attained, in which in addition to the steering wheel, further user control elements, such as a joystick or potentiometer, make it easier for the user to steer the agricultural machine.

Since these agricultural machines are increasingly involved in traffic, and their permissible speeds are constantly increasing, particular attention must be paid to safe function of the electrohydraulic steering system.

For instance, if the steering valve fails—for instance because of a seized piston—then the regulating piston of the steering valve may no longer be able to return to its neutral position (blocking position). In that case, even though the user has actuated the user control element in the direction of reducing the steering lock, nevertheless an additional quantity of pressure fluid continues to be fed to the steering motor via the proportional valve, so that the user has no capability, or only a very restricted capability, of steering correction; the agricultural machine becomes uncontrollable. Although it is possible for the malfunction to be displayed using the travel monitoring of the steering valve that is present in the prior art, nevertheless the user cannot actively take any countermeasures to rescind the steering lock.

SUMMARY OF THE INVENTION

In view of this, it is the object of the invention to enhance the operating safety of an electrohydraulic steering system.

This object is attained by an electrohydraulic steering system according to the present invention.

According to the invention, the electrohydraulic steering system is embodied with a steering unit, triggerable via a user control element, for supplying pressure fluid to a steering motor. This motor can be supplied with an additional quantity of pressure fluid via a steering valve, by way of a flow path of an additional pressure fluid. According to the invention, a blocking valve is located in this flow path of the additional pressure fluid and can be put into a blocking position in order to block the flow path of the additional pressure fluid to the steering motor. This blocking valve makes it possible, in the event of a malfunction, such as a seized piston of the steering valve, to block the flow path of the additional pressure fluid, so that the user remains capable of correcting the steering lock manually via the steering unit. As a result, even if the steering valve fails, the agricultural machine remains controllable.

In a preferred exemplary embodiment, it is preferred if at least one sensor for detecting the set desired value is associated with the user control element; triggering the steering valve and the blocking valve is done as a function of this set desired value via a control unit. Thus setting the steering valve located in the flow path of the additional pressure fluid and setting the blocking valve can be done as a function of a desired value set at the user control element (booster steering system).

It is especially preferred if these two valves are embodied with pickups for detecting the respective valve positions. The control unit is designed such that if one of the valves fails or malfunctions, the respective other valve is adjustable into a blocking position. In other words, in the event that the blocking valve does not establish its predetermined position, the steering valve is adjusted to a blocking position. Conversely, whenever the steering valve does not assume its desired position, the blocking valve is put in its blocking position in order to block off the flow path of the additional pressure fluid to the steering motor.

In an exemplary embodiment, the steering valve accordingly has a blocking position. It is furthermore adjustable into first work positions, in which a first work connection of the steering motor communicates with a pressure fluid source. It can also be adjusted into second work positions, in which a second work connection of the steering motor communicates with the pressure fluid source.

The blocking valve is preferably embodied as a switching valve.

In a preferred exemplary embodiment of the invention, the switching valve is a ⅔-way switching valve, which in its blocking position blocks off the flow path of the additional pressure fluid between the pressure fluid source and the steering motor and between a pressure fluid drop and the steering motor, and in its switching position opens this flow path of the additional pressure fluid.

It is preferable if the steering valve, in the first work positions, connects the second work connection to the pressure fluid sink, and in the second work positions connects the first work connection to the pressure fluid sink. In this exemplary embodiment, the additional quantity of pressure fluid is carried from the metering pump to the steering motor and from the steering motor back to the pressure fluid sink via the steering valve and the blocking valve.

It is especially preferable if the blocking valve is located in the pressure fluid flow path between the steering valve and the steering motor.

In an alternative version, only the additional flow of pressure fluid from the pressure fluid source to the steering motor is carried via the blocking valve and the steering valve, while the outflow of pressure fluid takes place via the steering unit.

In that case, the blocking valve and the steering valve can be embodied more simply than in the exemplary embodiment described above.

In the case in which no leakage via the electrohydraulic part of the steering system is allowable, the switching valve may be embodied as a seat valve.

The construction of the electrohydraulic steering system is especially simple if the pickup associated with the blocking valve is a terminal position switch and/or if the pickup associated with the continuously variable steering valve is a travel pickup, so that the failure of the blocking valve or of the steering valve is reliably detectable. In that case, not only the position of the steering valve but also its adjusting speed can be monitored, for instance in order to detect a malfunction of the steering valve early.

In one version, the correct setting of the steering valve can also be detected by measuring the actual additional volumetric flow of pressure fluid and by comparing this actual value with the desired value.

As the pressure fluid source for supplying the steering unit and/or for furnishing the additional quantity of pressure fluid, a constant pump or a variable pump can be used.

BRIEF DESCRIPTION OF THE DRAWINGS

Preferred exemplary embodiments of the invention will be described in further detail below in terms of schematic drawings. Shown are.

DETAILED DESCRIPTION OF THE PREFERRED EMBODIMENTS

Figure 1:
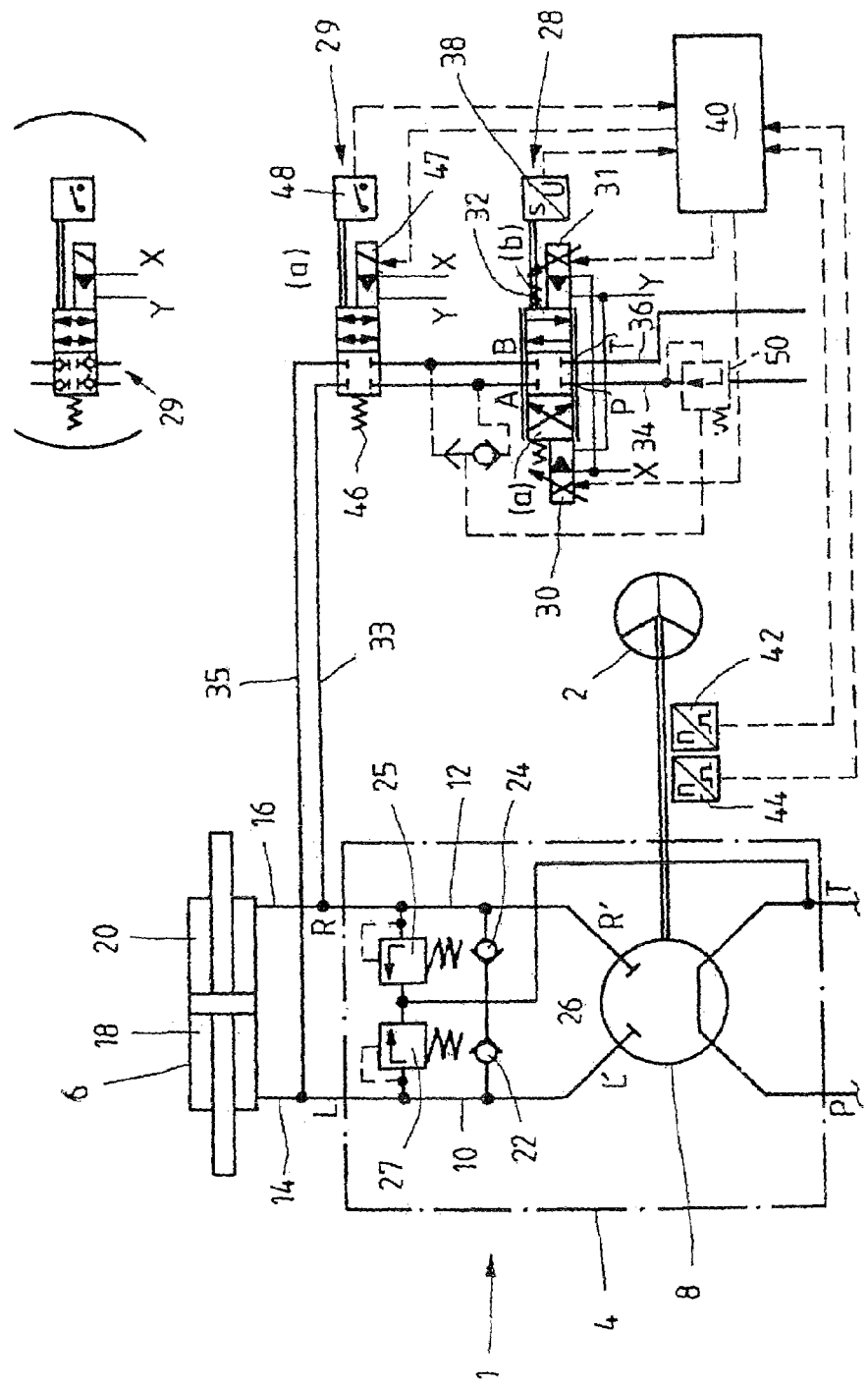
FIG. 1, a circuit diagram of a first exemplary embodiment of an electrohydraulic steering system.

FIG. 1 shows a circuit diagram of a first exemplary embodiment of an electrohydraulic steering system 1. This system essentially comprises a steering unit 4, actuatable via a user control element such as a steering wheel 2, by way of which steering unit a steering motor, in the exemplary embodiment shown a steering cylinder 6 embodied as a synchronizing cylinder, can be supplied with a steering quantity in order to set a steering lock of an agricultural machine, such as a wheel loader. The steering unit 4 essentially comprises a rotor set (metering pump) and a manually actuated servo valve of the rotary slide valve type. Such steering units (Orbitrol) are described at length in the data sheet RD 14 365/57.03 mentioned at the outset, so that a detailed description of the construction of the manually actuated servo valve and of the metering pump that operates on the Gerotor principle, can be dispensed with. The structural size of the metering pump is selected for instance such that steering can be done from one stop to the other with from 3 to 5 revolutions of the steering wheel. In the circuit diagram shown in FIG. 1, the manually actuated servo valve and the metering pump are indicated by the circular symbol 8 for an Orbitrol. The steering unit 1 has a pressure connection P and a tank connection T, which are connected to a pressure fluid source, such as a constant pump or variable pump or a pressure fluid sink, preferably a tank. The two work connections L' and R' of the unit comprising the metering pump and servo valve 8 communicate, via work conduits 10, 12 and control connections L, R of the steering unit 4 as well work lines 14, 16, with respective annular chambers 18 and 20 of the steering cylinder 6, so that upon actuation of the steering wheel 2, which is mechanically connected to the metering pump, and as a function of the direction of rotation of the steering wheel, pressure fluid is fed into the annular chamber 18 or 20, and correspondingly pressure fluid flows out of the other annular chamber 20 or 18 to the tank T.

Two reaspiration valves 22, 24 and two pressure limiting valves 25, 27 are located in a known manner between the two work lines 10, 12; the outlet of the two pressure limiting valves 25, 27 and the inlet to two reaspiration valves 22, 24 communicate with the tank connection T via a tank line 26. Via the two pressure limiting valves 25, 27 (also known as shock valves), the two connections L, R to the steering cylinder 6 are secured. If one of the pressure limiting valves 25, 27 responds, then the pressure fluid is delivered to the opposite side via the reaspiration valve on the low-pressure side. Via the two reaspiration valves 22, 24, replenishing pressure fluid can be aspirated from the tank.

In the event that the pump connected to the connection P fails, the steering unit 4 functions as a hand pump actuated via the steering wheel 2, so that the agricultural machine is steered without servo support. The pressure that can be attained by hand is dependent on the size of the rotor kit of the metering pump and on the force that can be exerted via the steering wheel. The smaller the rotor set is, the greater is the pressure that can be built up manually.

With the exemplary embodiment shown in FIG. 1, the function of an automatic steering system, a booster steering system, or power steering system, is made possible by supplying an (additional) steering quantity, hereinafter called the additional quantity of pressure fluid. The term "additional quantity of pressure fluid" is understood in general to mean a quantity of pressure fluid for adjusting the steering cylinder 6; it need not necessarily be added to a volumetric pressure fluid flow of the steering unit, and hence the steering cylinder 6 is also adjustable by means of only the additional quantity of pressure fluid. This quantity is set by way of a valve assembly, essentially comprising a continuously variable steering valve 28 at a 4/2-way switching valve 29. The steering valve 28 is provided with an electrohydraulic pilot control with two pilot control valves, and each pilot control valve is adjustable via a pilot control magnet 30, 31 embodied as a proportional magnet. The steering valve 28 is prestressed via a centering spring assembly 32 into a basic position in which a pressure connection P and a tank connection T are blocked off from two work connections A, B, and are adjustable into positions (a) or (b). The two work connections A, B communicate with the work line 16 and the work line 14, respectively, via respective lines 33 and 35 for additional pressure fluid. The two connections P, T of the steering valve 28 communicate with the pressure fluid source or the pressure fluid sink (constant pump/variable pump or tank) via a pump line 34 and an outflow line 36. The pilot control of the steering valve 28 can be subjected to a control pressure via a control connection X and can be relieved of control pressure via a control connection Y. The control fluid is carried away to the tank. The adjustment of the valve slide is detected via a travel pickup 38. The output signal of the travel pickup is evaluated by a control unit 40.

The triggering of the pilot control magnets 30, 31 is effected essentially via this control unit 40, as a function of the signal of two steering sensors 42, 44 located on the steering wheel, by way of which sensors the steering speed and direction are detectable—in a manner similar to that of a computer mouse. From these sensor signals and the desired stepup because of the additional quantity of pressure fluid, the control unit 40 calculates the quantity of pressure fluid that must be metered via the multi-way valve axis. Accordingly, the two steering sensors 42, 44 are advantageous, at least in a booster steering system.

In the exemplary embodiment shown, the switching valve 29 is located in the flow path of pressure fluid between the steering valve 28 and the steering cylinder 6. A piston of the switching valve 29 is prestressed into its blocking position shown via a spring 46, and in this position the pressure fluid communication between the work connections A, B of the steering valve 28 and the steering cylinder 6 is blocked off. By triggering an electrohydraulic pilot control of the switching valve 29, this valve can be switched to an open position (a), in which the pressure fluid communication between the work connections A, B of the steering valve 28 and the respective annular chambers 20 and 18 of the steering cylinder 6 is opened. The pilot control is embodied in turn with a control connection X and a control fluid tank connection Y; by switching over the switching magnet 47, the piston of the switching valve 29 can be subjected to the control pressure at the control connection X, in order to put this valve into its open position. This switch position is monitored by means of a terminal position switch 48. The actuation of the switching magnet 47 is effected via a signal output by the control unit 40. The signal generated by the terminal position switch 48 is likewise evaluated by the control unit 40.

In the exemplary embodiment shown, the travel pickup 38 and the terminal position switch 48 are provided essentially to inform the control unit 40 of the current piston position of the valve. In the event of a malfunction of one of the axes (switching valve axis, steering valve axis), the shutoff of the respective other axis is brought about via the control unit 40, and the flow path of the additional pressure fluid is blocked off, so that it remains possible for the user to control the agricultural machine solely via the steering unit 4.

In normal operation upon starting of the agricultural machine, the switching valve 29 is switched to its open position, so that upon actuation of the steering wheel 2, as a function of the steering lock and the steering speed, a desired signal is output to the control unit 40 via the steering sensors 42, 44. As a function of these signals and of the desired stepup, the control unit calculates an additional quantity of pressure fluid and outputs a signal accordingly to the pilot control of the steering valve 28. Upon an adjustment of the steering wheel to the left (L), the pilot control magnet 30 is correspondingly triggered via the control unit 40, in order to displace the valve slide of the steering valve 28 to the right (FIG. 1) into a position (a), so that its pressure connection P communicates with the work connection B, and the work connection A communicates with the tank connection T, and accordingly an additional quantity of pressure fluid is carried to the annular chamber 18 of the steering cylinder 6, and a corresponding quantity of pressure fluid is returned from the annular chamber 20, via the switching valve 29 and the work connection A as well as the tank connection T of the steering valve 28, to the tank T. The agricultural machine is controlled using a booster steering system, so that for a defined steering angle at the wheels, there is a reduction in the number of steering wheel revolutions required. For instance, in the case of a tractor at the end of a field, the user is spared work in turning the machine because the number of steering wheel revolutions is reduced.

By way of the continuously variable steering valve 28 and the switching valve 29, the agricultural machine can be steered even without actuation of the steering wheel 2, for instance via a potentiometer or a joystick—this mode of operation (comfort steering system) is advantageous particularly with a reverse station.

In traveling on the unplanted wheel tracks described at the outset, the automatic mode of operation can be switched on, in which the control of the agricultural machine takes place via GPS signals or other external signals.

In the event that either the switching valve axis 29 or the steering valve axis 28 fails, then via the control unit 40 the respective other valve axis is switched off or in other words put in the blocking position. This kind of malfunction in the continuously variable multiposition valve 28 can occur for instance from failure of one or both proportional magnets 30, 31, from failure of the travel pickup 38, or from a seizing piston. In the case of the switching valve 29, a failure is recognized if the terminal position switch 48 is defective, the switching magnet fails, or the piston of the switching valve seizes in the non-neutral position (open position). The sensor system at the two valve axes is selected such that as soon as the agricultural machine is switched on and thus before any unintentional motion occurs, the control unit 40 can test whether both valve axes 28, 29 are functioning properly, by means of a plausibility check. Not until this plausibility check is performed is the electrohydraulic steering system switched on. For instance, if instead of the terminal position switch 48 of the switching valve axis 29 only a travel sensor were located on the steering cylinder 6, then the malfunction of a valve axis could not be detected until after the steered wheels move, and thus with such a system, danger to persons could not be precluded.

Instead of the terminal position switch 48 in FIG. 1, an analog sensor could also be used. Besides monitoring the piston position, for both valve axes 28, 29 monitoring of the switching/adjusting times can also be employed in addition, so that by evaluating these times, a conclusion can be drawn as to whether a failure of the respective axis, for instance from soiling, is imminent.

In the exemplary embodiment described above, the position and thus the flow cross section of the continuously variable steering valve 28 is detected via the travel pickup 38. From the flow cross section, if the pressure difference is kept constant via the steering valve 28, the additional quantity of pressure fluid can be learned. As indicated with dashed lines in FIG. 1, the pressure difference can be kept constant with a pressure compensator. This pressure compensator 50 is incorporated into the pump line 54 and is urged in the opening direction by the force of a spring and by the higher of the two pressures in the work connections A and B of the steering valve 28 and is urged in the closing direction by the pressure at the pump connection P of the steering valve 28. Alternatively, the pressure drop across the steering valve, which is dependent on the steering resistance on the pump pressure, could also be detected via two pressure sensors, and the flow cross section could be adjusted in accordance with the desired additional quantity of pressure fluid.

As explained above, an alternative user control element, such as a joystick or a potentiometer, can be connected to the electronic control unit 40. For the automatic control, linking external signal sources is conceivable, so that in addition to the conventional steering system described above, the automatic function can also be represented.

For applications in which no leakage via the electrohydraulic part of the steering system is allowable, the switching valve axis 29 can also be embodied as a seat valve. This variant is shown in parentheses in FIG. 1.

In the exemplary embodiment described above, the additional quantity of pressure fluid carried to the steering cylinder 6 and the additional quantity of pressure fluid flowing out of the steering cylinder is carried via the two valve axes 28, 29. In a simplified exemplary embodiment, shown in FIG. 2, the additional quantity of pressure fluid is carried via the two valve axes 18, 20, while the entire volumetric flow of pressure fluid flowing out of the steering cylinder 6 is returned to the tank via the steering unit 4. In this kind of simplified variant, an automatic function is not possible, since manual adjustment of the steering unit is required.

Figure 2:
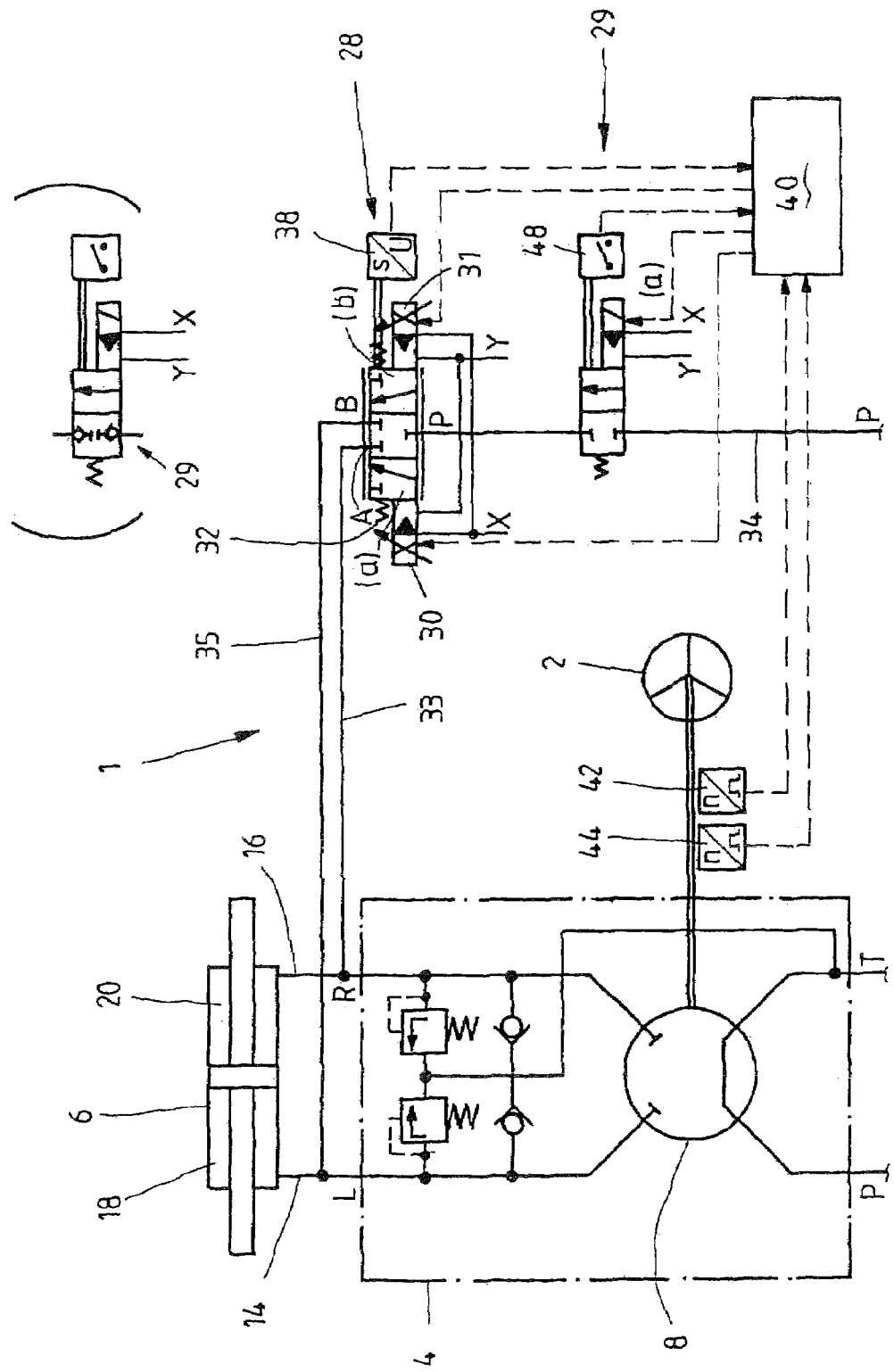
FIG. 2, a circuit diagram of a further, simplified exemplary embodiment.

In the exemplary embodiment shown in FIG. 2, the basic construction of the steering unit 4 and its connection to the steering cylinder 6 are the same as in the exemplary embodiment described above, so that with regard to them, for the sake of simplicity, the corresponding description of FIG. 1 is referred to.

In this exemplary embodiment, the steering valve 28 is embodied with three connections P, A, B; the two work connections A, B are connected to the lines 33 and 35, respectively, for additional pressure fluid. The continuously variable steering valve 28 is again embodied with an electrohydraulic pilot control and prestressed via a centering spring assembly 32 into a basic position in which the two work connections A, B and the pressure connection P are blocked off. The triggering of the proportional magnets 30, 31 of the pilot control is effected via signals output by the control unit 40, and the valve slide position is detected via the travel pickup 38. The pressure connection P of the steering valve 28 communicates with the pressure fluid source (constant pump, variable pump) via the pump line 34. The switching valve 29, which in this exemplary embodiment is embodied as a 2/2-way switching valve, is located in this pressure line 34. The 2/2-way switching valve can be put in its open position (a) by actuation of the switching magnet of its pilot control. The switchover is detected once again via the terminal position switch 48.

When the steering wheel is turned all the way to the right, current is supplied to the proportional magnet 31 via the control unit 40, so that the piston of the steering valve 28, as shown in FIG. 2, is displaced to the left, and the pressure connection P communicates with the work connection A. The additional quantity of pressure fluid is then fed into the annular chamber 20 on the right, via the opened switching valve 29 and the steering valve 28 and the line 33 for additional pressure fluid, and the pressure fluid positively displaced out of the annular chamber 18 on the left is returned to the tank T via the work line 14 and the steering unit 4. The adjustment of the steering valve 28 is again effected as a function of the signal of the steering sensors 42, 44. Only the monitoring of the adjustment of the steering valve 28 or of the switching valve 29 is effected via the pickups 38, 48. In the event that the control unit 40 detects a malfunction of one of the valve axes 28, 29, the respective axis is displaced to its blocking position, so that the flow path of the additional pressure fluid is blocked off, and the agricultural machine remains manually steerable via the steering wheel 2.

In this variant as well, the switching valve 29 can alternatively be embodied as a seat valve.

In the exemplary embodiments described above, pilot-controlled valve axes are provided; however, with relatively small volumetric flows, directly controlled axes can be used instead.

What is disclosed is an electrohydraulic steering system having a steering unit, triggerable via a user control element, for supplying a steering motor with pressure fluid. As a function of the actuation of the user control element or as a function of an external signal, the steering motor can be supplied with an additional quantity of pressure fluid via a steering valve. According to the invention, a blocking valve is located in the flow path of the additional pressure fluid and can be put in a blocking position in order to block the flow path of the additional pressure fluid to the steering motor.

LIST OF REFERENCE NUMERALS

1 Electrohydraulic steering system
2 Steering wheel
4 Steering unit
6 Steering cylinder
8 Servo valve/metering pump
10 Work conduit
12 Work conduit
14 Work line
16 Work line
18 Annular chamber
20 Annular chamber
22 Reaspiration valve
24 Reaspiration valve
25 Pressure limiting valve
26 Tank line
27 Pressure limiting valve
28 Continuously variable steering valve
29 Switching valve
30 Pilot control magnet
31 Pilot control magnet
32 Centering spring assembly
33 Line for additional pressure fluid
34 Pump line
35 Line for additional pressure fluid
36 Outflow line
38 Travel pickup
40 Control unit
42 Steering sensor
44 Steering sensor
46 Spring
47 Switching magnet
48 Terminal position switch
50 Pressure compensator

The invention claimed is:

1. An electrohydraulic steering system, comprising a steering unit including a steering motor triggerable via a user control element, and a continuously variable steering valve located in a flow path of an additional pressure fluid between a pressure fluid source and the steering motor for supplying the steering motor with an additional quantity of pressure fluid and triggerable as a function of an actuation of the user control element or as a function of an external signal; a blocking valve located in the flow path of the additional pressure fluid and puttable in a blocking position in order to block the flow path of the additional pressure fluid to the steering motor; pickups directly detecting a setting of the steering valve and a setting of the blocking valve and producing output signals; and a control unit receiving the output signals of the pickups and, if one of the values fails or malfunctions, adjusting a respective other valve into its blocking position.

2. An electrohydraulic steering system as defined in claim 1, further comprising at least one sensor for detecting a desired value set with the user control element, wherein the control unit is configured for triggering the steering valve and the blocking valve as a function of the desired value.

3. An electrohydraulic steering system as defined in claim 1, wherein the steering valve has a blocking position and also first work positions in which a first work connection communicates with the pressure fluid source and second work positions in which a second work connection communicates with the pressure fluid source.

4. An electrohydraulic steering system as defined in claim 1, wherein the blocking valve is a switching valve.

5. An electrohydraulic steering system as defined in claim 4, wherein the switching valve is a 4/2-way switching valve which in its blocking position blocks off the flow path of the additional pressure fluid between the pressure fluid source and the steering motor and between a pressure fluid drop in the steering motor, and in its switching position opens this flow path of the additional pressure fluid.

6. An electrohydraulic steering system as defined in claim 3, wherein the steering valve in the first work positions connects the second work connection to a pressure fluid sink, and in the second work positions connects the first work connection to the pressure fluid sink.

7. An electrohydraulic steering system as defined in claim 4, wherein the switching valve is located between the steering valve and the steering motor.

8. An electrohydraulic steering system as defined in claim 1, wherein the blocking valve is a 2/2-way switching valve which in its blocking position blocks the flow path of the additional pressure fluid between the pressure fluid source and the steering motor and in its switch position opens it, and the pressure fluid flowing out from the steering motor flows out to a pressure fluid sink via the steering unit.

9. An electrohydraulic steering system as defined in claim 1, wherein the blocking valve is a seat valve.

10. An electrohydraulic steering system as defined in claim 1, wherein the blocking valve has a pickup which is a terminal position switch.

11. An electrohydraulic steering system as defined in claim 1, wherein the steering valve has a pickup which is a travel pickup.

12. An electrohydraulic steering system as defined in claim 1, wherein the pressure fluid source is a pump selected from the group consisting of a constant pump and a variable pump.

* * * * *